US012725153B2

(12) United States Patent
Nguyen et al.

(10) Patent No.: US 12,725,153 B2
(45) **Date of Patent: *Sep. 1, 2026**

(54) METHOD AND APPARATUS FOR BOOKKEEPING, OWNING AND TRANSFERRING DIGITALLY LOCKED COINS

(71) Applicants: Darrion Vinh Nguyen, Milpitas, CA (US); Anthony Justin Nguyen, Milpitas, CA (US); Cynthia Katherine Nguyen, Milpitas, CA (US); Khanh Nguyen, Milpitas, CA (US)

(72) Inventors: Darrion Vinh Nguyen, Milpitas, CA (US); Anthony Justin Nguyen, Milpitas, CA (US); Cynthia Katherine Nguyen, Milpitas, CA (US); Khanh Nguyen, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/212,720

(22) Filed: May 20, 2025

(65) Prior Publication Data

US 2025/0278724 A1 Sep. 4, 2025

Related U.S. Application Data

(63) Continuation of application No. 17/403,896, filed on Aug. 17, 2021, now Pat. No. 12,333,536.

(51) Int. Cl.
*G06Q 20/38* (2012.01)
*G06Q 20/06* (2012.01)
(Continued)

(52) U.S. Cl.
CPC ......... *G06Q 20/389* (2013.01); *G06Q 20/065* (2013.01); *G06Q 20/102* (2013.01);
(Continued)

(58) Field of Classification Search
None
See application file for complete search history.

(56) References Cited

U.S. PATENT DOCUMENTS 10,262,321 B1 * 4/2019 Ramanathan ...... G06Q 20/3829
2020/0202349 A1 * 6/2020 Bougalis ............... H04L 9/0637
(Continued)

FOREIGN PATENT DOCUMENTS

WO WO-2018189634 A1 * 10/2018 ........... H04L 9/0861
WO WO-2021213920 A1 * 10/2021 ............... H04L 9/50

OTHER PUBLICATIONS

Romano, D., et al. "Beyond Bitcoin: Recent Trends and Perspectives in Distributed Ledger Technology", Cryptography 2021, 5, 36. (Year: 2021).*

(Continued)

*Primary Examiner* — Clay C Lee

(57) ABSTRACT

Bookkeeping, owning, and transferring digital coins using public-key cryptography. An exemplary digital coin payment system utilizes digitally locked coins that can be owned and transferred anonymously without the need for any owner account. Coin owners pay coins by using the digital keys of the coins to sign pay-to-the-order-of messages. Coin recipients use change-lock messages with proof of identity to change the digital locks of the received coins. The digitally locked coins are tracked in a public book that is maintained centrally or distributively by one or more bookkeepers. The system is efficient and provides fast, anonymous, and secure transactions. A related digital wallet apparatus and bookkeeping apparatus are also provided.

20 Claims, 2 Drawing Sheets

(51) Int. Cl.
*G06Q 20/10* (2012.01)
*H04L 9/32* (2006.01)

(52) U.S. Cl.
CPC ....... *G06Q 20/3825* (2013.01); *H04L 9/3263* (2013.01); *G06Q 2220/00* (2013.01)

(56) References Cited

U.S. PATENT DOCUMENTS

2021/0184850 A1* 6/2021 Shpurov ............... H04L 9/3247
2023/0360007 A1* 11/2023 Krishnaswamy ...... G06Q 20/10

OTHER PUBLICATIONS

Bitcoin: A Peer-to-Peer Electronic Cash System https://bitcoin.org/bitcoin.pdf.
Public-key cryptography https://en.wikipedia.org/wiki/Public-key_cryptography.

* cited by examiner

FIG. 2

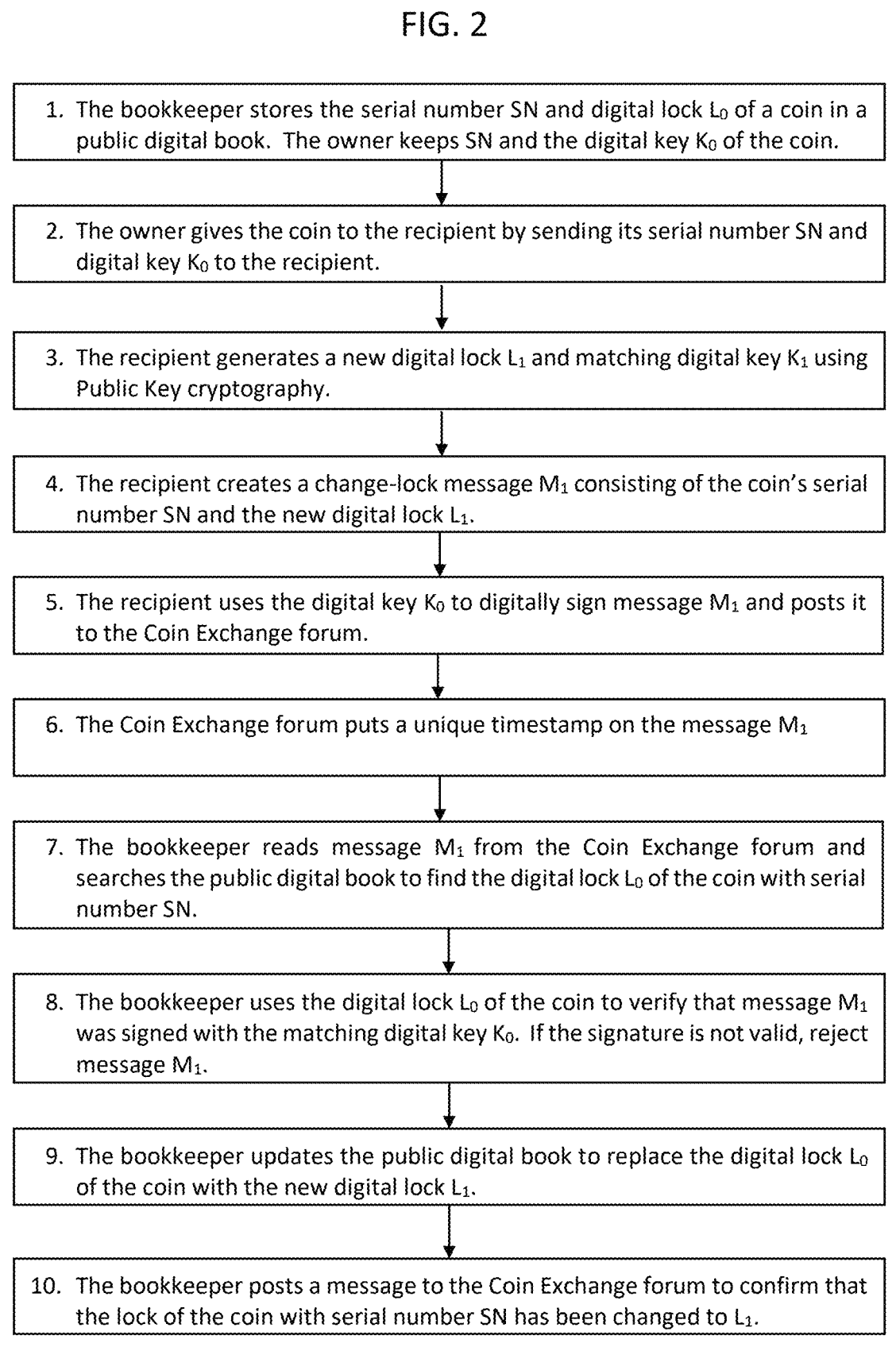

1. The bookkeeper stores the serial number SN and digital lock $L_0$ of a coin in a public digital book. The owner keeps SN and the digital key $K_0$ of the coin.

↓

2. The owner gives the coin to the recipient by sending its serial number SN and digital key $K_0$ to the recipient.

↓

3. The recipient generates a new digital lock $L_1$ and matching digital key $K_1$ using Public Key cryptography.

↓

4. The recipient creates a change-lock message $M_1$ consisting of the coin's serial number SN and the new digital lock $L_1$.

↓

5. The recipient uses the digital key $K_0$ to digitally sign message $M_1$ and posts it to the Coin Exchange forum.

↓

6. The Coin Exchange forum puts a unique timestamp on the message $M_1$

↓

7. The bookkeeper reads message $M_1$ from the Coin Exchange forum and searches the public digital book to find the digital lock $L_0$ of the coin with serial number SN.

↓

8. The bookkeeper uses the digital lock $L_0$ of the coin to verify that message $M_1$ was signed with the matching digital key $K_0$. If the signature is not valid, reject message $M_1$.

↓

9. The bookkeeper updates the public digital book to replace the digital lock $L_0$ of the coin with the new digital lock $L_1$.

↓

10. The bookkeeper posts a message to the Coin Exchange forum to confirm that the lock of the coin with serial number SN has been changed to $L_1$.

METHOD AND APPARATUS FOR BOOKKEEPING, OWNING AND TRANSFERRING DIGITALLY LOCKED COINS

RELATED APPLICATION

The present application is a continuation application of application Ser. No. 17/403,896, entitled CRYPTOCURRENCY USING DIGITALLY LOCKED COINS, and filed on Aug. 17, 2021.

The disclosure of the related application is incorporated by reference herein in its entirety.

TECHNICAL FIELD

The present disclosure generally relates to the field of digital coins, particularly bookkeeping, owning, and transferring digital coins using public-key cryptography.

BACKGROUND

This section describes approaches that could be employed, not necessarily being approaches that have been previously conceived or employed. Hence, unless explicitly specified otherwise, any approaches described in this section are not necessarily prior art to the claims in this application; and any approaches described in this section are not admitted to be prior art by inclusion in this section.

Payment systems based on traditional fiat money require trusted financial institutions such as banks to conduct payment transactions. More recently, cryptocurrency such as Bitcoin allows payment transactions to be conducted without the need for a centralized, trusted financial institution. However, current cryptocurrency systems have many limitations. For example, the Bitcoin mining process requires huge amounts of resources such as computing power and electricity and is not scalable. The Bitcoin system, despite a large number of miners, has a very limited transaction throughput, less than 10 transactions per second; and it takes a relatively long time, 10 minutes to hours, to confirm a transaction. The security of a Bitcoin account relies solely on its private key, and there is no extra layer to prevent or reverse fraudulent transactions. Bitcoin also has weak privacy since its transaction ledger is public.

This disclosure describes a new digital coin payment system that is secure, efficient, scalable, fast and offers strong privacy. The payment system can be implemented using either a centralized or distributed bookkeeping system. Bookkeepers in the new system do not have to be trusted since their books and operations are digitally auditable by the public.

SUMMARY

A digital wallet apparatus is provided for a digital coin owner to store and transfer digital coins. An apparatus for bookkeeping digital coins is also provided. Both apparatuses are part of a digital coin payment system.

A typical embodiment of the present digital coin payment system includes a set of digitally locked coins, one or more bookkeepers who keep track of the coins and handle coin transfers, and a communication channel such as a coin exchange forum for coin owners to send coin transfer requests to the bookkeepers and receive transfer confirmations. In this system, coin transfer requests are change-lock messages sent by coin recipients/payees rather than coin senders/payers.

Each digitally locked coin has a face value, a serial number, and two large numbers: a publicly known number serving as the digital lock of the coin and a secret number serving as the digital key to unlock the coin. Digitally locked coins are initially created by an issuer such as a central bank or a financial organization. The issuer of a coin defines its serial number and face value and uses public-key cryptography such as RSA to generate a pair of public-private keys to be used as the initial digital lock and digital key of the coin. The coin issuer keeps the digital key secret, and publishes the coin's face value, serial number, and digital lock in a public digital book.

The coin issuer, who is the first owner of the coins, gives the coins to secondary owners by sending them the serial numbers and digital keys of the coins. The secondary coin owners, in turn, can give the coins to other owners in the same way. Each time a new owner receives a coin, he or she uses its digital key to unlock it and relocks the coin with a new digital lock. The new owner of a coin changes the digital lock of the coin by posting a signed, anonymous "change-lock" message to the coin exchange forum. The bookkeepers validate the "change-lock" message, put the new digital lock on the coin, and post a message to the coin exchange forum to confirm the coin transaction. Additionally, a coin owner can pay a coin to a payee by sending a "pay-to-the-order-of" message which includes the serial number of the coin, an identity of the intended payee, and a digital signature signed using the digital key of the coin. The payee then includes his/her proof of identity in a "change-lock" message, and the bookkeeper will accept the "change-lock" message only if it is authentic and from the intended payee.

Bookkeeping in the present system is fast, scalable, and can be done by either a centralized bookkeeper or multiple distributed bookkeepers. Unlike other payment systems in which each bookkeeper must be a trusted entity such as a bank, bookkeepers in the present system can be any organization, and they do not need to be trusted since their operations are transparent and easily auditable by the public.

In addition to handling "change-lock" requests, bookkeepers can provide extra services such as notifying owners when their coins are being spent and supplying time-delay safe boxes to provide extra security on top of the coins' secret digital keys.

The present system allows for anonymous coin ownerships. Coin owners have strong privacy since the public digital book contains only information about coins, not their owners. Unlike in Bitcoin, owners do not need to reveal any address or account number in the transfer requests. Like with cash, people do not even need an account to own digitally locked coins. People can own digital coins by keeping their serial numbers and digital keys in any media, such as a secure electronic storage or even a piece of paper. The system supports anonymous payments as well as payments to authenticated payees when requested by payers

BRIEF DESCRIPTION OF THE DRAWINGS

To provide a more complete understanding of the present disclosure and advantages thereof, reference is made to the attached drawings, like reference numbers represent like parts.

FIG. 2 is a flowchart of a process of transferring a digitally locked coin from one owner to another, in accordance with an embodiment of the present invention.

DETAILED DESCRIPTION

Figure 1:
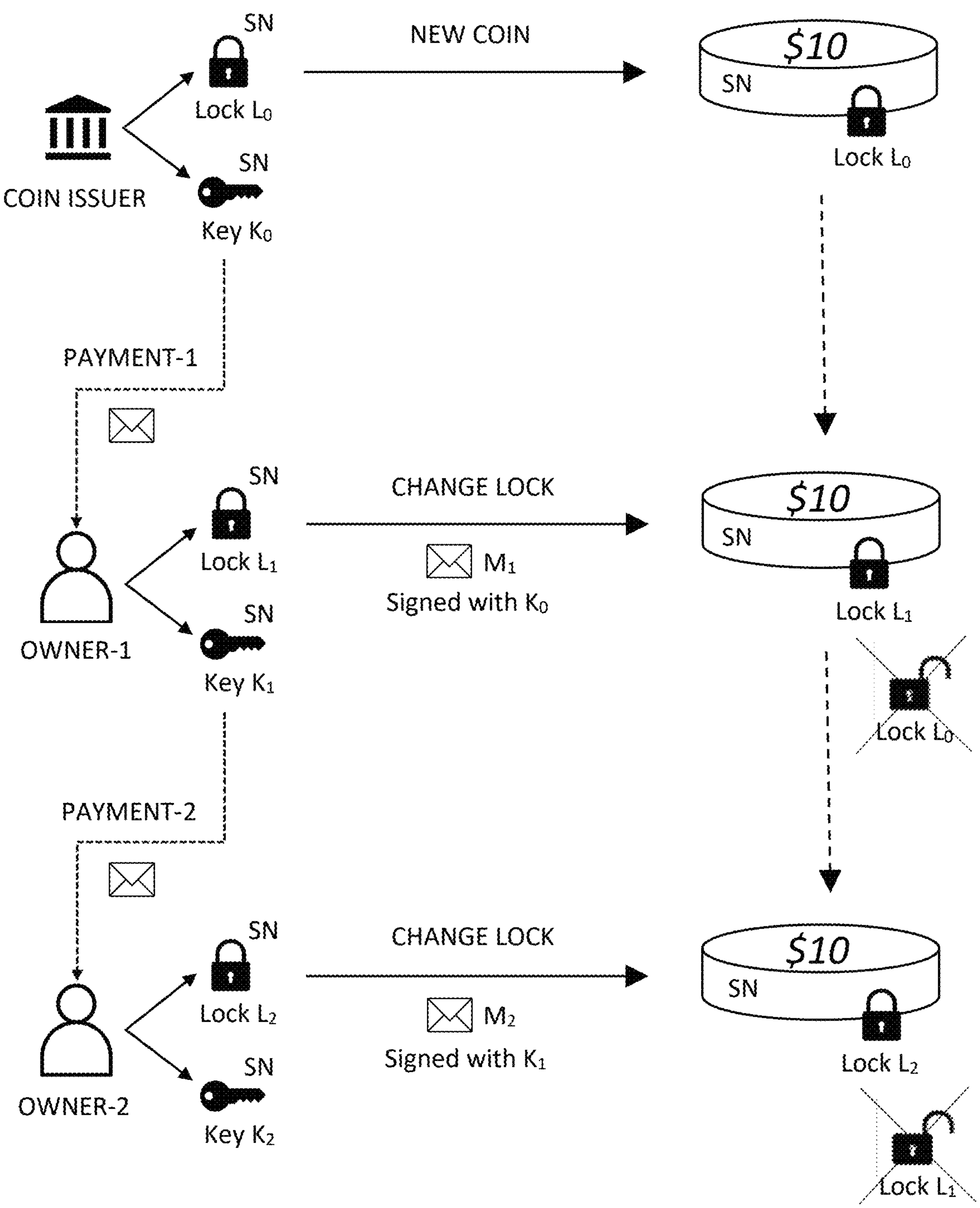
FIG. 1 is a flowchart showing a digitally locked coin with a public-key cryptography lock and how the coin is issued and transferred from one owner to another, in accordance with an embodiment of the present invention.

FIG. 1 illustrates an example embodiment of a digitally locked coin and how it is issued to an owner and then transferred to another owner. Each digitally locked coin has a monetary face value, a serial number that uniquely identifies the coin, a publicly known digital lock, and a secret digital key. For example, the coin in FIG. 1 has the face value of $10 and the serial number SN. Initially, COIN ISSUER uses public-key cryptography such as RSA to generate a pair of public-private keys. The generated public key is used as the digital lock of the coin, and the private key is used as the digital key of the coin. In FIG. 1, the initial digital lock and key of the coin are $L_0$ and $K_0$ respectively. The face value, serial number SN, and digital lock $L_0$ of the coin are published in a public digital book that is maintained by one or more bookkeepers. COIN ISSUER gives the coin to the first owner OWNER-1 by sending him the coin's serial number SN and digital key $K_0$ in the private message PAYMENT-1.

After receiving the coin, OWNER-1 changes the digital lock of the coin by using public-key cryptography to generate a new digital lock $L_1$ and digital key $K_1$, saving the digital key $K_1$ in a safe place, putting the serial number SN and the new digital lock $L_1$ in the "change-lock" message $M_1$, using the digital key $K_0$ to digitally sign the message $M_1$, and sending the message $M_1$ to the bookkeepers. Upon reading the "change-lock" message $M_1$, the bookkeepers use the serial number SN to retrieve the digital lock $L_0$ of the coin from the public digital book and use the digital lock $L_0$ to verify that the message $M_1$ was signed with the matching digital key $K_0$. If the digital signature is valid, the bookkeepers update the public digital book to record the new digital lock $L_1$ for the coin with serial number SN. The coin, now having the digital lock $L_1$, is now owned by the new owner who possesses the secret digital key $K_1$.

Subsequently, OWNER-1 can give the coin to the next owner OWNER-2 by sending him the coin's serial number SN and digital key $K_1$ in the private message PAYMENT-2. When OWNER-2 receives the coin, he should prevent double spending of the coin by the previous owner by immediately changing the digital lock of the coin using the same process as above.

An owner may send the same coin to two recipients at the same time, and each of them will send a "change-lock" message to the bookkeepers. To prevent double spending, if the bookkeepers receive two "change-lock" requests for the same coin, the bookkeepers will use a predetermined priority rule to decide which request is honored. For example, the predetermined priority rule may state that the earlier request will be honored, and the later request will be rejected. To determine which request is earlier, the coin exchange forum can use a timestamp server to put a unique timestamp on each request received. The recipient with the rejected transaction will be notified accordingly.

Note that in this present system, the public digital book and all the exchanged messages include information only about the coins, without revealing any information about their owners. In contrast, Bitcoin ledgers and messages contain the Bitcoin addresses of the sender and recipient in each transaction. Although Bitcoin addresses are anonymous, they could be de-anonymized in many cases.

Note also that in this present system, as soon as an owner has successfully transferred a coin to a new owner, only the new digital lock and the new digital key are needed for the next transfer. All previous digital keys and digital locks are no longer needed except for auditing purposes.

FIG. 2 illustrates an embodiment of a process of transferring a digitally locked coin. In step 1, the bookkeeper stores the face value, serial number SN, and digital lock $L_0$ of a coin in a public digital book. The owner of the coin keeps the serial number SN and the digital key $K_0$ of the coin. The digital lock $L_0$ and digital key $K_0$ of the coin are generated using public-key cryptography such as RSA.

In step 2, the owner of the coin gives it to a recipient by sending its serial number SN and digital key $K_0$ to the recipient via some secure private message.

Upon receiving the coin from the previous owner, the recipient needs to change the digital lock of the coin. In step 3, the recipient uses public-key cryptography to generate a new digital lock $L_1$ and matching digital key $K_1$. In step 4, the recipient creates a change-lock message $M_1$ containing the serial number SN of the coin and the new digital lock $L_1$. In step 5, the recipient uses the digital key $K_0$ received from the previous owner to digitally sign the message $M_1$ and posts the message $M_1$ to the coin exchange forum. The recipient keeps the digital key $K_1$ in a safe place such as a secure digital wallet.

In step 6, the coin exchange forum puts a unique timestamp on the message $M_1$. This timestamp is used to prevent double spending when an owner sends the digital key and serial number of the same coin to two recipients at the same time. In this case, the recipient who sends the change-lock message with the earlier timestamp will become the new owner of the coin. The other recipient will see his/her change-lock message rejected.

The change-lock message $M_1$ posted to the coin exchange forum will be processed by the bookkeeper. In step 7, the bookkeeper reads the serial number SN and the new digital lock $L_1$ from the message $M_1$ and searches the public digital book to find the digital lock $L_0$ of the coin with serial number SN. In step 8, the bookkeeper uses the digital lock $L_0$ found in step 7 to verify that the message $M_1$ was signed with the matching digital key $K_0$. If the signature verification fails, the bookkeeper rejects the message $M_1$; otherwise, in step 9, the bookkeeper updates the public digital book to replace the old digital lock $L_0$ of the coin with the new digital lock $L_1$. In step 10, the bookkeeper confirms the change-lock transaction by posting a message to the coin exchange forum. The coin now belongs to the new owner, or whoever has the new secret digital key $K_1$ that matches the new lock $L_1$.

Audit Chain

In addition to the work described in FIG. 1, the bookkeeper can perform additional work to provide extra services such as auditing. To support auditing of the public digital book, the bookkeeper can keep a chain of digital locks and associated lock-change messages for each coin. For example, the audit chain of the coin in FIG. 1 can be recorded as:

SN: $L_0$, $M_1$, $L_1$, $M_2$, $L_2$, . . .

The public can use this audit chain to verify that the bookkeeper's work is correct. Starting with the initial digital lock $L_0$, the public can validate the next digital lock $L_1$ by verifying that the digital lock $L_1$ is in the message $M_1$, and that the message $M_1$ was signed with a digital key that matches the digital lock $L_0$. Once a periodic audit is done, and the book is certified, e.g., at the end of the year, audit chains can be truncated so they will not grow unbounded like the Bitcoin block chains.

Notification Service, Time-Delay Safe, and Stop Payment

In case the digital keys of some coins are stolen or used without authorization, the bookkeeper can offer a notification service to alert coin owners when someone sends requests to change the locks of their coins.

To prevent hackers from changing the locks and thus stealing their coins, owners can ask the bookkeeper to put their coins in a time-delay safe. In this case, there will be a predetermined time delay between a "change-lock" request and the time the lock is changed. This gives the coin owners a window of time to stop unauthorized transfers. If some hacker steals the digital key of a coin and tries to use it, the owner will receive a notification about the pending "change-lock" request. Since the coin is in a time-delay safe, the owner will have a window of time to send a "stop-change" message to the bookkeeper to stop the "change-lock" message, thereby preventing the hacker from stealing the coin. Like a "change-lock" message, a "stop-change" message needs to be signed digitally using the coin's digital key. If the bookkeeper receives both "change-lock" and "stop-change" messages during the time delay, the "stop-change" message will override. Once a coin is in such a dispute, the legitimate owner can resolve the dispute by using some extra authentication such as a physical ID to prove his/her ownership to reclaim the coin. Conversely, to protect themselves against unscrupulous payers, a payee can structure the transfer of goods or performance of service to take into account the time delay.

In case of fraudulent coin transfers, the system may allow an authority such as a court to override the digital locks of the stolen coins and put new locks on them. In this case, the audit chains of the coins can have a reference to the court order in lieu of the change-lock messages.

Pay-to-the-Order-of and Proof of Payment

The coin transfer process described in FIG. 2 is anonymous and thus does not provide any proof of payment between a payer and a payee. For example, after a payer sends the digital key of a coin to a payee, they both have the same key, and either of them can change the lock of the coin anonymously. In one scenario, after the payee changes the lock of the coin, he/she can deny it and claim that it was the payer who changed the lock to get the coin back, and vice versa. In this case, third parties cannot tell who changed the lock and got the coin, so the payment cannot be confirmed by a third party. This is analogous to paying someone with cash. If there is no witness or record, the payee can falsely claim that he/she has not received the payment.

To solve this problem, a bookkeeper can provide a service to authenticate the payee and provide proof of payment to the payer. To use this service, a payer sends to the bookkeeper a "pay-to-the-order-of" message which includes the serial number of the coin and the identity of the intended payee. The identity of the payee can be an ID number, an account number, an email address, a phone number, or other authenticable digital identity. The "pay-to-the-order-of" message must be signed using the digital key of the coin. The bookkeeper then verifies that the payee includes his/her proof of identity in the change-lock message and honors the message only if it is authentic and from the intended payee. The proof of identity can be a secure digital identification such as an authentication certificate or a digital signature such as an Identity-based Cryptography (IBC) signature. Once the change-lock message is authenticated, the bookkeeper executes the lock change and issues proof of payment to the payer. Note that the identity of the payee can be encrypted so that only the bookkeeper can read it from the messages and the transaction remains anonymous to the public. Another option to hide the identity of a payee and to prevent linking transactions to the same payee is to use a one-time identity derived from the real identity of the payee. The bookkeeper can also use an external, trusted authentication service.

Distributed Bookkeeping

For redundancy, there can be multiple bookkeepers working to maintain the public digital book in a distributed way. In this case, each bookkeeper has a copy of the public digital book. If bookkeepers use the same coin exchange forum, their copies of the public digital book will be consistent because they process the same messages from the coin exchange forum in the same orders. If there are multiple coin exchange forums, these forums need to pool their messages and synchronize their clocks to maintain a single message order across all forums; otherwise the bookkeepers' books may diverge.

Digital Wallet Software

A coin owner can use a digital wallet software to store their digitally locked coins and to send and receive coins. The software includes a computer program that sends "change-lock" and "pay-to-the-order-of" messages, receives proof of payments and notifications from bookkeepers, and alerts the owner when there is a pending "change-lock" message for one of his/her coins. If the owner has his/her coins in a time-delay safe, the program, upon receiving a notification about an unauthorized "change-lock" message, can automatically send a "stop-change" message to the bookkeeper to stop the unauthorized "change-lock" message.

What is claimed is:

1. A method of operating digital coins, comprising:

issuing a plurality of digital coins, wherein each digital coin comprises:
- a serial number that uniquely identifies the digital coin;
- a face value; and
- a digital lock and a matching digital key which are a pair of public key and private key, respectively, generated using public-key cryptography;

using a plurality of digital wallets for coin owners to store and transfer digital coins, wherein each digital wallet comprises:
- a computer storage device to store digital keys and serial numbers of digital coins owned by a coin owner;
- a first digital wallet software configured to send pay-to-the-order-of messages, wherein each of the pay-to-the-order-of messages comprises a serial number of a digital coin, an identity of an intended payee and a digital signature signed using a digital key of the digital coin; and
- a second digital wallet software configured to send change-lock messages, wherein each of the change-lock messages comprises a serial number of a coin, a new digital lock of the coin, and a proof of identity;

providing a bookkeeping computer system which facilitates digital coin transfers among coin owners, comprising:
- storing the serial numbers, face values, and current digital locks of the plurality of digital coins in a digital book;
- receiving, using a communication channel, pay-to-the-order-of messages and change-lock messages from the digital wallets of the coin owners; and processing the pay-to-the-order-of messages and the change-lock messages and changing digital locks stored in the digital book in accordance with the pay-to-the-order-of messages and the change-lock messages; and transferring a digital coin from a first of the digital wallets belonging to a first coin owner (payer) to a second of the digital wallets belonging to a second coin owner (payee), comprising:

transmitting, by the first digital wallet, a pay-to-the-order-of message comprising the serial number of the digital coin, an identity of the intended payee, and a digital signature signed using a current digital key of the digital coin and public-key cryptography;

generating, by the second digital wallet using public-key cryptography, a new digital lock and a new digital key for the digital coin;

creating, by the second digital wallet, a change-lock message comprising the serial number of the digital coin, the new digital lock of the digital coin, and a proof of identity of the payee;

transmitting, by the second digital wallet using the communication channel, the change-lock message to the bookkeeping computer system;

receiving, by the bookkeeping computer system, the pay-to-the-order-of message and the change-lock message;

retrieving, by the bookkeeping computer system using the serial number of the digital coin, a current digital lock of the digital coin from the digital book;

verifying, by the bookkeeping computer system using public-key cryptography, that the digital signature was signed using a digital key that matches the current digital lock of the digital coin;

verifying, by the bookkeeping computer system using the proof of identity of the payee, that the change-lock message is authentic and from the intended payee; and upon successful verification of the digital signature and the change-lock message, replacing, by the bookkeeping computer system, the current digital lock of the digital coin in the digital book with the new digital lock from the change-lock message and sending a confirmation to the second digital wallet to confirm that the new digital lock has been recorded in the digital book.

2. The method of claim 1, wherein the proof of identity of the payee is a digital signature.

3. The method of claim 2, wherein the identity of the intended payee is a one-time identity, and the proof of identity is a digital signature of the one-time identity.

4. The method of claim 1, further comprising issuing, by the bookkeeping computer system, a proof of payment to the payer after replacing the current digital lock of the digital coin with the new digital lock.

5. The method of claim 1, further comprising sending, by the bookkeeping computer system, an alert to a coin owner when there is a change-lock message for one of the digital coins of the coin owner.

6. The method of claim 1, further comprising requesting, by one of the coin owners, the bookkeeping computer system to wait a predetermined time between the time when a change-lock message is received for one of the digital coins of the coin owner and the time when the digital lock of the digital coin is changed.

7. The method of claim 6, further comprising, during the predetermined time, sending, by the coin owner, a message to the bookkeeping computer system to block the change-lock message.

8. The method of claim 1, further comprising keeping, by the bookkeeping computer system, a chain of digital lock changes and associated change-lock messages for each of the digital coins for auditing.

9. A computer-implemented digital wallet apparatus for a digital coin owner to store and transfer digital coins, comprising:

a computer storage device configured to store digital coins, each digital coin comprises:

a serial number that uniquely identifies the digital coin;

a face value; and a digital lock and a matching digital key which are a pair of public key and private key, respectively, generated using public-key cryptography; and a computer system comprising:

a first computer program configured to send at least one of the digital coins from the computer storage device by sending a pay-to-the-order-of message, the pay-to-the-order-of message comprising the serial number of each of the at least one of the digital coins, an identity of an intended payee, and a digital signature signed using a digital key of each of the at least one of the digital coins; and a second computer program configured to receive at least one digital coin, comprising:

receiving a payment message containing the serial number of each of the at least one digital coin;

generating, by using public-key cryptography, a new pair of public key and private key which are a new digital lock and a new digital key, respectively, for each of the at least one digital coin;

creating a change-lock message which contains the serial number of each of the at least one digital coin, the new digital lock of each of the at least one digital coin, and a proof of identity; and sending the change-lock message to a communication channel to request a bookkeeping computer system to change the digital lock of each of the at least one digital coin to the new digital lock, wherein the bookkeeping computer system comprises a digital book, which is a computer storage device that stores information about a plurality of digital coins, and a computer program configured to process the change-lock message, wherein the computer program comprises:

retrieving, using the serial number of each of the at least one digital coin, the current digital lock of each of the at least one digital coin from the digital book;

verifying, using the proof of identity, that the change-lock message is authentic and from the intended payee of a pay-to- the-order-of message; and upon successful verification of the change-lock message, replacing the current digital lock of each of the at least one digital coin in the digital book with the new digital lock of each of the at least one digital coin from the change-lock message and sending a confirmation to the digital wallet apparatus to confirm that the digital lock of each of the at least one digital coin has been successfully changed to the new digital lock.

10. The apparatus of claim 9, wherein the proof of identity is a digital signature.

11. The apparatus of claim 10, wherein the identity of the intended payee is a one-time identity, and the proof of identity is a digital signature of the one-time identity.

12. The apparatus of claim 9, wherein the computer program of the bookkeeping computer system is further configured for issuing a proof of payment to the digital wallet after changing the digital lock of each of the at least one digital coin.

13. The apparatus of claim 9, wherein the computer system further comprises a third computer program configured to receive a notification from the bookkeeping computer system in the event that the bookkeeping computer system has a pending change-lock message in respect of a digital coin stored in the computer storage device.

14. The apparatus of claim 13, wherein the computer system further comprises a computer program configured to, upon receipt of the notification, automatically send a message to the bookkeeping computer system to block the pending change-lock message when the pending change-lock message is unauthorized.

15. A computer-implemented apparatus for bookkeeping digital coins, comprising:

a digital book, which is a computer storage device that stores information about a plurality of digital coins, wherein the information about each digital coin comprises:

a serial number that uniquely identifies the digital coin;

a face value; and a digital lock which is the public key in a pair of public key and matching private key generated using public-key cryptography;

a communication channel configured to receive at least one change-lock message from a digital wallet apparatus, wherein the digital wallet apparatus includes a computer storage device to store digital coins and a computer system comprising:

a first computer program configured to send at least one digital coin from the computer storage device to a recipient by sending a pay-to-the- order-of message containing the serial number of each of the at least one digital coin, an identity of an intended payee, and a digital signature signed using a digital key of each of the at least one digital coin; and a second computer program configured to receive at least one digital coin, comprising:

receiving a payment message containing the serial number of each of the at least one digital coin;

generating, by using public-key cryptography, a new pair of public key and private key which are a new digital lock and a new digital key, respectively, for each of the at least one digital coin;

creating the change-lock message which contains the serial number of each of the at least one digital coin, the new digital lock of each of the at least one digital coin, and a proof of identity; and sending the change-lock message to the communication channel to request the bookkeeping apparatus to change the digital lock of each of the at least one digital coin to the new digital lock; and a computer system running a computer program configured to process the change-lock message, wherein the computer program comprises:

retrieving, using the serial number of each of the at least one digital coin in the change-lock message, the current digital lock of each of the at least one digital coin from the digital book;

verifying, using the proof of identity in the change-lock message, that the change-lock message is authentic and from an intended payee of a pay- to-the-order-of message; and upon successful verification of the change-lock message, replacing the current digital lock of each of the at least one digital coin in the digital book with the new digital lock of each of the at least one digital coin from the change-lock message and sending a confirmation to confirm that the new digital lock for each of the at least one digital coin has been recorded in the digital book.

16. The apparatus of claim 15, wherein the proof of identity is a digital signature.

17. The apparatus of claim 16, wherein the identity of the intended payee is a one-time identity, and the proof of identity is a digital signature of the one-time identity.

18. The apparatus of claim 15, wherein the computer program issues a proof of payment after changing the digital lock of each of the at least one digital coin.

19. The apparatus of claim 15, wherein the computer program sends a notification to the owner of the digital coin and waits for a predetermined time delay before changing the digital lock of each of the at least one digital coin to the new digital lock, and the computer program stops the replacement of the current digital lock of each of the at least one digital coin with the new digital lock in the event that it receives a signed stop-change message from the owner of the digital coin during the time delay.

20. The apparatus of claim 15, wherein a chain of digital lock changes and associated change-lock messages for each digital coin are recorded for auditing.

* * * * *